United States Patent [19]
Witte

[11] 3,972,278
[45] Aug. 3, 1976

[54] APPARATUS FOR TREATING FINELY DIVIDED MATERIALS WITH GASEOUS FLUID

[75] Inventor: Johan Frederik Witte, Amsterdam-Nieuwendam, Netherlands

[73] Assignee: Stork Amsterdam B.V., Amstelveen, Netherlands

[22] Filed: Aug. 29, 1974

[21] Appl. No.: 501,824

[30] Foreign Application Priority Data
Aug. 31, 1973 Netherlands........................ 7312094

[52] U.S. Cl...................................... 99/451; 34/164; 99/516; 241/263
[51] Int. Cl.²..................... F26B 17/02; F26B 17/26; A23L 1/00
[58] Field of Search ............. 99/451, 484, 477, 516; 34/90, 164, 241, DIG. 2; 241/200, 263

[56] References Cited
UNITED STATES PATENTS
1,213,962  1/1917  Siler................................. 34/DIG. 2
2,419,876  4/1947  Birdseye .......................... 34/DIG. 2
3,216,344  11/1965  Beagle .............................. 99/477 X FOREIGN PATENTS OR APPLICATIONS
439,638  12/1935  United Kingdom.............. 34/DIG. 2

Primary Examiner—Stanley N. Gilreath
Assistant Examiner—Alan I. Cantor
Attorney, Agent, or Firm—Haseltine, Lake & Waters

[57] ABSTRACT

Device for treating finely divided materials with a treatment fluid, particularly for conditioning oil containing vegetable raw materials, comprising one or more vibratory conveyors with a perforated bottom and at least one inlet opening under a perforated bottom for introducing a treatment fluid. The device is provided with pulverizing members and an additional perforated plate for pulverizing the greater particles formed by clotting during the action of the treatment fluid.

10 Claims, 4 Drawing Figures

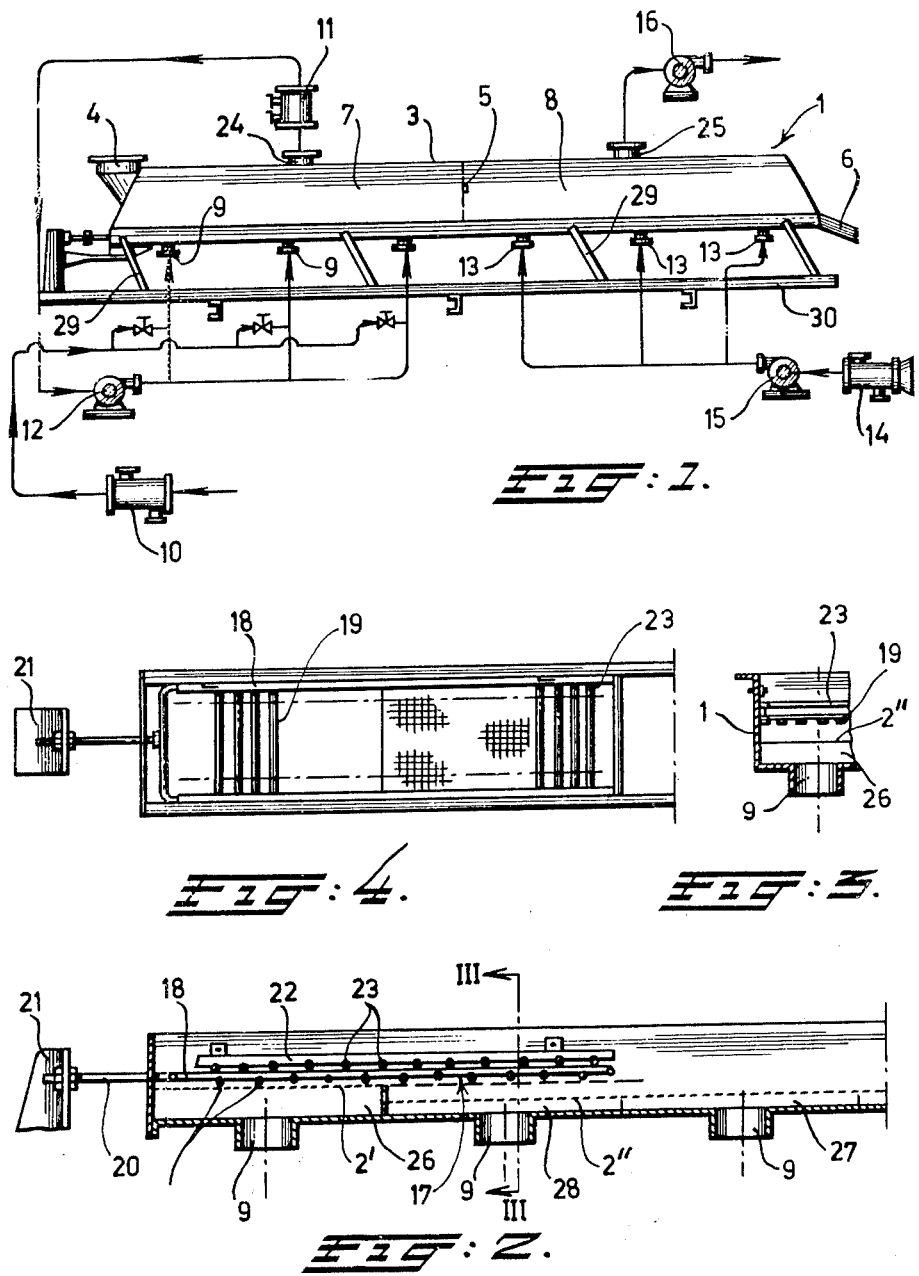

APPARATUS FOR TREATING FINELY DIVIDED MATERIALS WITH GASEOUS FLUID

BACKGROUND OF THE INVENTION

My invention relates to a device for treating finely divided materials with a treatment fluid, particularly for conditioning oil containing vegetable raw materials, comprising one or more vibratory conveyors with perforated bottom and at least one inlet opening under a perforated bottom, for introducing a treatment fluid.

Such a device for treating finely divided materials with gaseous media, e.g. for drying sugar, is known per se. In order to prevent, in this known device, the perforated bottom from becoming obstructed, when drying materials, said bottom is covered, for example, with flexible sheets, whereby incrustation of the transport surface is avoided.

Though this device is suitable for preventing incrustation it can not be used to pulverize sufficiently the lumps produced by clotting. This is a considerable disadvantage when pre-treating oil containing vegetable raw materials, while moreover the difficulty is met that during the steam treatment in the first stage of the treatment of oil containing vegetable raw materials, clotting of the pulverized oil containing vegetable raw materials occurs. These clots of material cannot be dried in the normal drying time and constitute, after normal drying, an untreatable product.

Clotting and adherence of the raw material to the bottom of a vibrator conveyor is substantially produced in the first stage of heating and humidifying the pulverized oil containing vegetable raw materials. Clots pulverized after this stage do not show these symptoms anymore when they are further heated and exposed to the effect of steam for humidification. When the treatment is performed under the right circumstances, the already partially pre-treated oil containing raw material has moreover after humidification, still sufficient agglomerating properties to bind the dust meanwhile formed during pulverization, so that a product with excellent extraction properties is obtained.

Since the structure of the raw material after same has passed through the first stage of thermal treatment, that is to say: heating and humidification by means of steam, has been changed such that already on minor pressure oil issues, whereby balls form which cannot be treated any further, pulverization should be performed with great care meanwhile.

SUMMARY OF THE INVENTION

My invention aims to provide a device which does not present the aforementioned disadvantages and in which lumps formed in the first stage due to clotting, can be pulverized, while after pulverization the material can bind again the dust formed during this process and a product is obtained with excellent extraction properties.

This is attained by the arrangement wherein the device is provided with pulverizing members for pulverizing the greater particles, formed by clotting, during the action of the treatment fluid.

The pulverizing members comprise advantageously a plurality of spaced rods disposed behind one the other, which are arranged at least over a first bottom part of the perforated bottom.

By using such rods it is possible to achieve a sparing pulverization of the material.

It is very advisable that the rods consist of a first stationary unit of a row of rods, which either cooperate with the perforated bottom or are at a minor height over this bottom and a second unit of a row of rods slightly spaced above the first stationary unit, while the second unit is secured such that it can move along with the vibratory conveyor.

When using a first stationary unit the difficulty may arise that the transport of material by the conveyor is hindered and sometimes does not take place at all. These difficulties are alleviated by means of a second unit of a row of rods disposed at some distance e.g. 1.5 to 2 cm over the first unit. A very favorable effect of this construction is that clots formed in the first stage of the humidification and heating of the oil containing vegetable materials, are broken when passing by the two grids moving relative to one the other.

In order to keep the perforated bottom of the vibratory conveyor clean, the distance between the rods of the first unit should be at least equal to the stroke length of the vibratory conveyor.

The rods of the first unit are efficiently united to a frame work, whereby they re positioned over the bottom with a minor clearance. Thus, hard wear of the perforated bottom is avoided.

With particular advantage the pulverizing members comprise further a sieve bottom, extending over a bottom part of a second vibratory conveyor, which follows on a first bottom part, the second vibratory conveyor being at a lower level than the bottom part of the first vibratory conveyor, while the sieve bottom is aligned with the bottom part of the first vibratory conveyor and the first stationary unit of a row of rods and the second unit of a row of rods, which is movable along with the vibratory conveyor, extend over this sieve bottom.

The material passing through the sieve bottom can thus take a particular size, while moreover optimal results may be achieved, when the partially pre-treated material immediately after pulverization has been brought into contact with the steam required for the continuation of the thermal treatment, since every particle after it has passed through the sieve bottom and had fallen to the bottom of the second vibratory conveyor, which is at a lower level, can be separately "washed" by the steam. In this way a product is obtained, in case of oil containing vegetable raw materials, which lends itself particularly well for extraction purposes.

The device of the invention carries out to a method for conditioning oil containing vegetable raw materials, the oil containing product being conveyed and the pulverized raw materials subjected to a treatment by steam and subsequently to a treatment with a drying gas, characterized in that the clots formed during the first humidification are subjected to a pulverizing treatment and preferably the material obtained during this pulverizing treatment is further brought into contact with steam such that each particle is individually washed by the steam.

The latter condition is satisfied by the arrangement that the particles after pulverization, are caused to fall through a steam containing medium.

SURVEY OF THE DRAWINGS

FIG. 1 shows schematically a device according to the invention;

FIG. 2 shows partially a longitudinal section through such a device;

FIG. 3 is a cross section according to line III—III, and FIG. 4 is a plan view.

DESCRIPTION OF PREFERRED EMBODIMENTS

In FIG. 1 is represented in outline a device for treating finely divided materials with gaseous media. Hereinafter the treatment is further clarified with reference to the process of conditioning pulverized oil containing vegetable products but it is obvious that the device can also be used for many other finely divided materials which can give rise to the formation of clots during treatment with gaseous fluids.

The device for treating finely divided materials with gaseous media comprises a vibratory conveyor casing 1 with a perforated bottom which is subdivided into a first bottom part 2' and a second bottom part 2''. The second bottom part 2'' is situated at a level lower than that of the first bottom part 2' of the perforated bottom of the vibratory conveyor 1. The vibratory conveyor is provided with an exhaust hood 3 with an inlet 4 for feeding the finely divided materials. On the exhaust hood 3 on the inner side thereof is a partition 5 extending to a distance several cm above the stream of raw materials moving through the apparatus. There is further provided an outlet 6 for discharging the treated materials. The vibratory conveyor is divided into two parts by means of the partition 5 to wit a first part or conditioning part 7 and a second part or drying part 8, wherein the oil containing material is dried to the percentage of moisture required for the extraction.

For feeding a gaseous fluid to a chamber 26 which is underneath the perforated bottom part 2' of the vibratory conveyor, there is at least one gaseous medium inlet 9 for feeding steam. Generally superheated steam coming from a heat exchanger 10 and to which 5 to 10% of air is admixed, whereupon the mixture is supplied to the chamber 26, is used in treating and conditioning finely divided oil containing vegetable raw materials. In connection with the thermal economy the air, after it has passed through the raw material to be treated, passes via a medium outlet 24, to a heat exchanger 11 and is heated again to the steam temperature and thereupon, mixed with steam by means of a blower 12, introduced into the chamber 26.

The device is further provided with another inlet 13 for the gaseous medium (in this case there are three of such inlets), whereby air heated via a heat exchanger 14 can be passed by means of a blower 15 to the other inlets 13 for the gaseous medium, so that the material treated can be dried. An exhaust device in the form of a blower 16 is arranged for discharging the exhaust drying air.

For oscillating the vibratory conveyor with the perforated bottom, the device is provided with springs 29 which are secured to frame 30 and to casing 1 of the vibratory conveyor.

The perforated bottom of the vibratory conveyor 1 is as mentioned hereinbefore, divided into two parts 2' and 2'', the parts being situated at different levels. In addition thereto the perforated bottom part 2' is continued by a sieve bottom 17 extending over a part of a perforated bottom part 2'' to wit in the entire length of the chamber 28.

It is obvious that instead of using one vibratory conveyor with bottom parts 2' and 2'' also more vibratory conveyors arranged in cascade could be used, that is to say a separate vibratory conveyor with the bottom part 2', a second separate vibratory conveyor with a sieve bottom over the bottom part 2'' proper as far as chamber 28 extends, a third vibratory conveyor with chamber 28, a fourth separate vibratory conveyor with chamber 27 and so on.

The partition 5, extending in operation several cm over the stream of raw material moving through the apparatus, allows exhaust of the vapour-air mixture from the first or conditioning part 7 separate from the exhaust drying air from the second or drying part 8 via the discharge outlets 24, 25, respectively.

When more individual vibratory conveyors are used such a partition. can be omitted.

When oil containing raw materials are treated, sieve bottom 17 extends along the entire length of the bottom part 2'' of the vibratory conveyor which extends over chamber 28.

The materials falling through sieve bottom 17 are washed by steam which is supplied via chamber 28 and perforated bottom 2''. This treatment results in a product which lends itself extraordinarily well for extraction. Moreover dust formed during pulverization is bound by the product obtained during this second action of steam.

Thereupon the oil containing material can still be subjected to a treatment by steam supplied via chamber 27.

The device is also provided with a first unit 18, comprising a plurality of rods 19 in a frame, the rods 19 being disposed with minor clearance relative to the first bottom part 2' of the perforated bottom, in order to avoid wear of the part 2' of the vibratory conveyor. This unit 18 is secured by means of a rod 20 to a support 21, so that when the vibratory conveyor is moving, the rod 20 with the unit 18 and associated rods 19 remains stationary. The stroke length of the vibratory conveyor is substantially equal to the distance between two consecutive rods 19, whereby the entire perforated part 2' of the bottom of the vibratory conveyor can be kept free from incrustations.

Since there is a risk that the transport of material with such a stationary unit 18 having rods 19 is hindered or even becomes completely impossible the device is also provided with a second unit 22 of rods 23, which can move along with the vibratory conveyor, while the spacing of the rods 23 with respect to each other may correspond to the stroke length of the vibratory conveyor. Due to the cooperation of the rods 22 and the rods 19 conglomerations of pulverized material are pulverized again. Owing to suitable selection of the size of the openings of the sieve bottom (e.g. 6 mm) material with a particular size can fall, through a steam medium coming from chamber 28, on the second bottom part 2''.

The first space 7 which is underneath hood 3 can be separated by means of partition 5 from the second space 8 which is located to the right of the hood and the partition 5. The space 7 is provided with outlet 24 leading to the heat exchanger 11.

In addition thereto the second space 8 is provided with second section-outlet 25 which is connected to the exhaust device represented by the blower 16.

The rods 19 and 23 are shaped as bars e.g. 3 mm in thickness and situated in a direction perpendicular to the vibratory conveyor. The second unit 22 with the rods 23 is located about 1.5 to 2 cm over the sieve bottom 17.

The distance between sieve bottom 17 and the second bottom 2" is some 2 cm plus the layer thickness to be expected of the material to be treated.

As the mesh size of the sieve bottom 1 relates to the average grain size of the finished product one may possibly regulate at least within certain limits, the grain size of the product.

I claim:

1. Device for treating finely divided materials with a treatment fluid, particularly for conditioning oil containing vegetable raw materials traveling in a conveyed zone from a rear part to a front part, comprising at least one vibratory conveyor with a perforated bottom and at least one inlet, opening under the perforated bottom, for introducing a treatment fluid, and pulverizing means for pulverizing the larger particles formed by clotting during the action of the treatment fluid, said pulverizing means being disposed above said perforated bottom and being active over the total width and a substantial portion of the length of the conveyed zone of material.

2. Device according to claim 1, wherein the pulverizing means comprises a plurality of spaced rods disposed behind one another, which rods are located at least over a first bottom part of the perforated bottom.

3. Device according to claim 2, wherein the rods consist of a first stationary unit of a row of rods which cooperate with the perforated bottom and a second unit of a row of rods slightly spaced above the first stationary unit, said second unit being secured for movement with the vibratory conveyor.

4. Device according to claim 1, wherein the pulverizing means comprises a sieve bottom extending over the perforated bottom of the vibratory conveyor, a first stationary unit of a row of rods and a second unit of a row of rods movable with the vibratory conveyor, said rods extending above the sieve bottom and cooperating therewith.

5. Device according to claim 4, wherein the spacing between the rods of the first unit is equal to the stroke length of the vibratory conveyor.

6. Device according to claim 1, wherein the vibratory conveyor comprises a first bottom part with an adjacent second bottom part, situated at a lower level, while over this second bottom part extends a sieve bottom which is the continuation of the aforementioned first bottom part.

7. Device according to claim 1, wherein the vibratory conveyor includes an exhaust hood with separate outlets for a steam-air mixture and a drying gas medium.

8. Device according to claim 7, wherein the exhaust hood carries on its inner side a partition extending to the vicinity of the perforated bottom, the medium outlets being located on either side of the partition.

9. Device according to claim 7, the exhaust hood having an inlet for material on its frontside and an outlet for material on its backside.

10. Device according to claim 1, wherein the mesh size of the sieve bottom corresponds to the material to be treated and processed.

* * * * *